United States Patent [19]

Jalics et al.

[11] Patent Number: 5,753,579

[45] Date of Patent: May 19, 1998

[54] TRANS MICROSTRUCTURE DIRECTING INITIATOR SYSTEM

[75] Inventors: George Jalics, Akron; Adel Farhan Halasa, Bath, both of Ohio

[73] Assignee: The Goodyear Tire & Rubber Company, Akron, Ohio

[21] Appl. No.: 578,798

[22] Filed: Dec. 26, 1995

[51] Int. Cl.$^6$ ............................................. C08F 4/50
[52] U.S. Cl. ...................... 502/153; 502/154; 502/157; 526/176; 526/177; 526/187; 526/188; 526/340
[58] Field of Search .......................... 526/176, 177, 526/187, 188; 502/153, 154, 157

[56] References Cited

U.S. PATENT DOCUMENTS

| | | | |
|---|---|---|---|
| 4,080,492 | 3/1978 | de Zarauz | 526/177 |
| 4,129,705 | 12/1978 | de Zarauz | 526/176 X |
| 4,260,712 | 4/1981 | Aggarwal et al. | 526/176 X |
| 4,302,568 | 11/1981 | Bingham et al. | 526/187 |
| 4,424,322 | 1/1984 | Hattori et al. | 526/176 X |
| 4,996,273 | 2/1991 | Van Der Huizen | 526/177 |
| 5,064,800 | 11/1991 | Van Der Huizen | 502/153 |
| 5,086,136 | 2/1992 | Takashima et al. | 526/177 |
| 5,216,181 | 6/1993 | Hargis et al. | 526/177 X |

*Primary Examiner*—Fred Teskin
*Attorney, Agent, or Firm*—Alvin T. Rockhill

[57] ABSTRACT

The process of this invention can be utilized to synthesize polymers having a high trans microstructure. The polymers which can be prepared utilizing the procedure of this invention include high trans-1,4-polybutadiene, styrene-isoprene-butadiene terpolymers with high trans-1,4-polybutadiene microstructures, high trans-isoprene-butadiene copolymers, and styrene-butadiene copolymers having high trans-1,4-polybutadiene microstructures. Such polymers can be utilized in tire tread rubber compounds which exhibit improved wear characteristics, tear resistance and low temperature performance characteristics. This invention more specifically reveals a process for synthesizing a high trans polymer which comprises adding (a) at least one organolithium initiator or organomagnesium initiator, (b) an organoaluminum compound, (c) a barium alkoxide, and (d) an organozinc compound to a polymerization medium which is comprised of an organic solvent and at least one conjugated diene monomer.

11 Claims, No Drawings

TRANS MICROSTRUCTURE DIRECTING INITIATOR SYSTEM

BACKGROUND OF THE INVENTION

Trans-1,4-polybutadiene is a thermoplastic resin by virtue of its high level of crystallinity. Because trans-1,4-polybutadiene (TPBD) contains many double bonds in its backbone, it can be blended and cocured with rubbers. Even though TPBD is a thermoplastic resin, it becomes elastomeric when cured alone or when cocured with one or more rubbers.

TPBD is normally prepared utilizing transition metal catalysts or rare earth catalysts. The synthesis of TPBD with transition metal catalysts is described by J. Boor Jr., "Ziegler-Natta Catalysts and Polymerizations", Academic Press, New York, 1979, Chapters 5-6. The synthesis of TPBD with rare earth catalysts is described by D. K. Jenkins, Polymer, 26, 147 (1985). However, molecular weight control is difficult to achieve with such transition metal or rare earth catalysts and monomer conversions are often very modest.

Better molecular weight control could be achieved by utilizing an anionic polymerization system to produce the TPBD. There is typically an inverse relationship between the catalyst level utilized and the molecular weight attained when anionic polymerization systems are used. Such an anionic polymerization system is disclosed in U.S. Pat. No. 4,225,690. The catalyst system disclosed therein is based on a dialkylmagnesium compound which is activated with a potassium alkoxide. However, only a minor amount of the polymer produced with such dialkyl magnesium based catalyst systems is TPBD. In other words, the small amount of TPBD produced utilizing such catalyst systems is always accompanied by major amounts of hexane-soluble polybutadiene of mixed microstructure.

Japanese Patent Application No. 67187-1967 discloses a catalyst system and technique for synthesizing TPBD consisting of 75 to 80% trans-1,4-structure and 20 to 25% 1,2-structure. The catalyst system described by this reference consists of a cobalt compound having a cobalt organic acid salt or organic ligand, an organoaluminum compound and phenol or naphthol. Gel formation is a serious problem which is frequently encountered when this three component catalyst system is utilized in the synthesis of TPBD. Gelation is a particularly serious problem in continuous polymerizations.

U.S. Pat. No. 5,100,982 discloses a catalyst system which can be utilized in the polymerization of 1,3-butadiene monomer into trans-1,4-polybutadiene, said catalyst system being comprised of an organocobalt compound, an organoaluminum compound, a para-alkyl substituted phenol which contains from about 12 to about 26 carbon atoms, and carbon disulfide. By utilizing such a catalyst system TPBD can be synthesized in a continuous process with only minimal amounts of gel formation.

U.S. Pat. No. 5,100,965 discloses a process for synthesizing a high trans polymer which comprises adding (a) at least one organolithium initiator, (b) an organoaluminum compound, (c) a barium alkoxide, and (d) a lithium alkoxide to a polymerization medium which is comprised of an organic solvent and at least one conjugated diene monomer.

U.S. Pat. No. 5,100,965 further discloses that high trans polymers can be utilized to improve the characteristics of tire tread rubber compounds. By utilizing high trans polymers in tire tread rubber compounds, tires having improved wear characteristics, tear resistance, and low temperature performance can be made. Such high trans polymers include, trans-1,4-polybutadiene, trans styrene-isoprene-butadiene terpolymers, isoprene-butadiene copolymers, and trans-styrene-butadiene copolymers.

SUMMARY OF THE INVENTION

This invention relates to a process for synthesizing high trans polymers. The technique of this invention involves the utilization of an organo lithium initiator. Because the polymerizations of this invention are anionic in nature, the molecular weight and resulting Mooney viscosity and dilute solution viscosity of the polymers produced can be easily regulated. In the polymerizations of this invention, there is an inverse relationship between the catalyst level utilized and the molecular weight attained. This classical relationship is a result of the anionic nature of the polymerization.

The utilization of the catalyst system and techniques of this invention result in virtually no gel formation. Because living polymers are produced by the polymerizations of this invention, functional groups can be added thereto to further improve performance characteristics. The high trans polymers which result from the polymerizations of this invention can also be coupled with agents such as tin tetrachloride or silicon tetrachloride to improve processability.

A blocky polymer is produced by the unmodified terpolymerization of 1,3-butadiene, isoprene, and styrene due to vastly differing rates of reactivity. For instance, 1,3-butadiene will generally polymerize first followed by the isoprene and then the styrene. The terpolymer produced accordingly is comprised of a first block which is predominately polybutadiene, a second block which is predominately polyisoprene, and a third block which is predominately polystyrene. By utilizing the initiator system of this invention the rates of reactivity of the 1,3-butadiene, isoprene, and styrene are almost equal. In fact, the utilization of the initiator system of this invention can result in an azeotropic polymerization of styrene with 1,3-butadiene and/or isoprene. By utilizing the initiator system of this invention much higher levels of styrene can be incorporated by azeotropic copolymerization. Also, by utilizing the initiator system of this invention much higher levels of styrene can be incorporated than can be realized when other types of initiator systems are employed.

The subject invention more specifically reveals a process for synthesizing a high trans polymer which comprises polymerizing at least one conjugated diene monomer in the presence of at least one organolithium initiator, an organoaluminum compound, a barium alkoxide and an organozinc compound.

The subject invention also reveals a process for synthesizing a high trans polymer which comprises polymerizing at least one conjugated diene monomer in the presence of at least one organomagnesium initiator, an organoaluminum compound, a barium alkoxide and an organozinc compound.

The present invention further discloses a process for synthesizing a high trans polymer which comprises adding (a) at least one organolithium initiator, (b) an organoaluminum compound, (c) a barium alkoxide, and (d) an organozinc compound to a polymerization medium which is comprised of an organic solvent and at least one conjugated diene monomer.

The present invention further discloses a process for synthesizing a high trans polymer which comprises adding (a) at least one organomagnesium initiator, (b) an organoaluminum compound, (c) a barium alkoxide, and (d) an organozinc compound to a polymerization medium which is comprised of an organic solvent and at least one conjugated diene monomer.

The present invention also reveals a catalyst system which is the reaction product of (a) at least one organolithium initiator, (b) an organoaluminum compound, (c) a barium alkoxide, and (d) an organozinc compound.

The present invention also reveals a catalyst system which is the reaction product of (a) at least one organomagnesium initiator, (b) an organoaluminum compound, (c) a barium alkoxide, and (d) an organozinc compound.

The subject invention further discloses a process for synthesizing a high trans polymer which comprises (1) mixing (a) at least one organolithium initiator, (b) an organoaluminum compound, (c) a barium alkoxide, and (d) an organozinc compound to produce a preformed initiator system; and (2) adding the preformed initiator system to a polymerization medium which is comprised of an organic solvent and at least one conjugated diene monomer.

The subject invention further discloses a process for synthesizing a high trans polymer which comprises (1) mixing (a) at least one organomagnesium initiator, (b) an organoaluminum compound, (c) a barium alkoxide, and (d) an organozinc compound to produce a preformed initiator system; and (2) adding the preformed initiator system to a polymerization medium which is comprised of an organic solvent and at least one conjugated diene monomer.

DETAILED DESCRIPTION OF THE INVENTION

The polymerizations of the present invention will normally be carried out in a hydrocarbon solvent which can be one or more aromatic, paraffinic, or cycloparaffinic compounds. These solvents will normally contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture.

In the solution polymerizations of this invention, there will normally be from 5 to 30 weight percent monomers in the polymerization medium. Such polymerization media are, of course, comprised of the organic solvent and monomers. In most cases, it will be preferred for the polymerization medium to contain from 10 to 25 weight percent monomer. It is generally more preferred for the polymerization medium to contain 15 to 20 weight percent monomers.

The high trans polymers made utilizing the catalyst system and technique of this invention are derived from at least one conjugated diolefin monomer. Such high vinyl polymers are comprised of repeat units which are derived from one or more conjugated diolefin monomers. These high trans polymers typically have a trans-microstructure content of about 60% to about 85%.

By utilizing the process of this invention, high trans polymers can be prepared by copolymerizing conjugated diolefin monomers with one or more other ethylenically unsaturated monomers. For instance, styrene-butadiene copolymers can be prepared by copolymerizing isoprene with butadiene. Styrene-isoprene-butadiene terpolymers are another example of high trans polymers which can be prepared by terpolymerizing styrene with butadiene and isoprene.

The conjugated diolefin monomers which can be utilized in the synthesis of such polymers generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1, 3-octadiene, 2-phenyl-1,3-butadiene, and the like, alone or in admixture. Some representative examples of ethylenically unsaturated monomers that can potentially be synthesized into high trans polymers include alkyl acrylates, such as methyl acrylate, ethyl acrylate, butyl acrylate, methyl methacrylate and the like; vinylidene monomers having one or more terminal $CH_2=CH-$ groups; vinyl aromatics such as styrene, α-methylstyrene, bromostyrene, chlorostyrene, fluorostyrene and the like; α-olefins such as ethylene, propylene, 1-butene, and the like; vinyl halides, such as vinylbromide, chloroethane (vinylchloride), vinylfluoride, vinyliodide, 1,2-dibromoethene, 1,1-dichloroethene (vinylidene chloride), 1,2-dichloroethene, and the like; vinyl esters, such as vinyl acetate; α,β-olefinically unsaturated nitriles, such as acrylonitrile and methacrylonitrile; α,β-olefinically unsaturated amides, such as acrylamide, N-methyl acrylamide, N,N-dimethylacrylamide, methacrylamide and the like.

High trans polymers which are copolymers of one or more diene monomers with one or more other ethylenically unsaturated monomers will normally contain from about 50 weight percent to about 99 weight percent conjugated diolefin monomers and from about 1 weight percent to about 50 weight percent of the other ethylenically unsaturated monomers in addition to the conjugated diolefin monomers. For example, copolymers of conjugated diolefin monomers with vinylaromatic monomers, such as styrene-butadiene rubber copolymers which contain from 50 to 95 weight percent conjugated diolefin monomers and from 5 to 50 weight percent vinylaromatic monomers are useful in many applications.

Vinyl aromatic monomers are probably the most important group of ethylenically unsaturated monomers which are commonly incorporated into polydienes. Such vinyl aromatic monomers are, of course, selected so as to be copolymerizable with the conjugated diolefin monomers being utilized. Generally, any vinyl aromatic monomer which is known to polymerize with organolithium initiators can be used. Such vinyl aromatic monomers typically contain from 8 to 20 carbon atoms. Usually the vinyl aromatic monomer will contain from 8 to 14 carbon atoms. The most widely used vinyl aromatic monomer is styrene. Some examples of vinyl aromatic monomers that can be utilized include 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene, and the like.

The high trans polymers made in accordance with this invention exhibit a low polydispersity. The ratio of the weight average molecular weight to the number average molecular weight of such polymers is less than 1.5. It is more typical for the ratio of the weight average molecular weight to the number average molecular weight of such polymers to be less than about 1.3. It is normally preferred for the high trans polymers of this invention to have a ratio of weight average molecular weight to number average molecular weight which is less than about 1.2.

The high trans polymers made in accordance with this invention have a melting point which is within the range of about −20° C. to about 40° C. They also have a glass transition temperature which is within the range of about −60° C. to about −95° C. The exact melting point and glass transition temperature of the high trans polymer will vary with its monomeric makeup.

The styrene-butadiene copolymers synthesized in accordance with this invention typically contain from about 1 to about 80 weight percent styrene and from about 20 to about 99 weight percent butadiene. These styrene-butadiene copolymers preferably contain from about 10 to about 35 weight percent styrene and from about 65 to about 90 weight percent butadiene. It is typically most preferred for such high trans styrene-butadiene copolymers to contain from about 15 to about 30 weight percent styrene and from about 70 to about 85 weight percent butadiene.

The styrene-isoprene-butadiene terpolymers synthesized in accordance with this invention will typically contain from about 1 to about 15 weight percent styrene, from about 1 to about 15 weight percent isoprene, and from about 70 to about 98 weight percent butadiene. The high trans styrene-isoprene-butadiene terpolymers made in accordance with this invention will more typically contain from about 2 to about 10 weight percent styrene, from about 2 to about 10 weight percent isoprene, and from about 80 to about 90 weight percent butadiene. Such high trans styrene-isoprene-butadiene terpolymers will preferably contain from about 3 to about 6 weight percent styrene, from about 3 to about 6 weight percent isoprene, and from about 88 to about 94 weight percent butadiene.

The high trans isoprene-butadiene rubbers synthesized in accordance with this invention will typically contain from about 5 to about 30 weight percent isoprene and from about 70 to about 95 weight percent butadiene. Such high trans isoprene-butadiene copolymers will more typically contain from about 10 to about 25 weight percent isoprene and from about 75 to about 90 weight percent butadiene. Such copolymers will preferably contain from about 15 to about 20 weight percent isoprene and from about 80 to about 85 weight percent butadiene.

The polymerizations of this invention are initiated by adding an organolithium initiator, an organoaluminum compound, a barium alkoxide, and a organozinc compound to a polymerization medium containing the monomers to be polymerized. Such polymerization can be carried out utilizing batch, semi-continuous or continuous techniques.

The organolithium initiators employed in the process of this invention include the monofunctional and multifunctional types known for polymerizing the monomers described herein. The multifunctional organolithium initiators can be either specific organolithium compounds or can be multifunctional types which are not necessarily specific compounds but rather represent reproducible compositions of regulable functionality.

The amount of organolithium initiator utilized will vary with the monomers being polymerized and with the molecular weight that is desired for the polymer being synthesized. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

The choice of initiator can be governed by the degree of branching and the degree of elasticity desired for the polymer, the nature of the feedstock, and the like. With regard to the feedstock employed as the source of conjugated diene, for example, the multifunctional initiator types generally are preferred when a low concentration diene stream is at least a portion of the feedstock, since some components present in the unpurified low concentration diene stream may tend to react with carbon lithium bonds to deactivate initiator activity, thus necessitating the presence of sufficient lithium functionality in the initiator so as to override such effects.

The multifunctional initiators which can be used include those prepared by reacting an organomonolithium compounded with a multivinylphosphine or with a multivinylsilane, such a reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate which can be solubilized if desired, by adding a solubilizing monomer such as a conjugated diene or monovinyl aromatic compound, after reaction of the primary components. Alternatively, the reaction can be conducted in the presence of a minor amount of the solubilizing monomer. The relative amounts of the organomonolithium compound and the multivinylsilane or the multivinylphosphine preferably should be in the range of about 0.33 to 4 moles of organomonolithium compound per mole of vinyl groups present in the multivinylsilane or multivinylphosphine employed. It should be noted that such multifunctional initiators are commonly used as mixtures of compounds rather than as specific individual compounds.

Exemplary organomonolithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, cyclohexyllithium, and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and the like.

Exemplary multivinylphosphine compounds include trivinylphosphine, methyldivinylphosphine, dodecyldivinylphosphine, phenyldivinylphosphine, cyclooctyldivinylphosphine, and the like.

Other multifunctional polymerization initiators can be prepared by utilizing an organomonolithium compound, further together with a multivinylaromatic compound and either a conjugated diene or monovinylaromatic compound or both. These ingredients can be charged initially, usually in the presence of a hydrocarbon or a mixture of a hydrocarbon and a polar organic compound as a diluent. Alternatively, a multifunctional polymerization initiator can be prepared in a two-step process by reacting the organomonolithium compound with a conjugated diene or monovinyl aromatic compound additive and then adding the multivinyl aromatic compound. Any of the conjugated dienes or monovinyl aromatic compounds described can be employed. The ratio of conjugated diene or monovinyl aromatic compound additive employed preferably should be in the range of about 2 to 15 moles of polymerizable compound per mole of organolithium compound. The amount of multivinylaromatic compound employed preferably should be in the range of about 0.05 to 2 moles per mole of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8- divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene, and the like. Divinyl aromatic hydrocarbons containing up to 18 carbon atoms per molecule are preferred, particularly divinylbenzene as either the ortho, meta, or para isomer, and commercial divinylbenzene, which is a mixture of the three isomers, and other compounds such as the ethylstyrenes, also is quite satisfactory.

Other types of multifunctional initiators can be employed such as those prepared by contacting a sec- or tert-organomonolithium compound with 1,3-butadiene, at a ratio of about 2 to 4 moles of the organomonolithium compound per mole of the 1,3-butadiene, in the absence of added polar material in this instance, with the contacting preferably being conducted in an inert hydrocarbon diluent, though contacting without the diluent can be employed if desired.

Alternatively, specific organolithium compounds can be employed as initiators, if desired, in the preparation of polymers in accordance with the present invention. These can be represented by R(Li)x wherein R represents a hydrocarbyl radical containing from 1 to 20 carbon atoms, and wherein x is an integer of 1 to 4. Exemplary organolithium compounds are methyllithium, isopropyllithium, n-butyllithium, sec-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The organoaluminum compounds that can be utilized typically have the structural formula:

in which $R^1$ is selected from the group consisting of alkyl groups (including cycloalkyl), aryl groups, alkaryl groups, arylalkyl groups, alkoxy groups, and hydrogen; $R^2$ and $R^3$ being selected from the group consisting of alkyl groups (including cycloalkyl), aryl groups, alkaryl groups, and arylalkyl groups. Some representative examples of organoaluminum compounds, that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include triethyl aluminum (TEAL), tri-n-propyl aluminum, triisobutyl aluminum (TIBAL), trihexyl aluminum and diisobutyl aluminum hydride (DIBA-H).

The barium alkoxides which can be utilized typically have the structural formula:

$$R^1\text{---}O\text{---}Ba\text{---}R^2$$

wherein $R^1$ and $R^2$ can be the same or different and represent alkyl groups (including cycloalkyl groups), aryl groups, alkaryl groups or arylalkyl groups. Some representative examples of suitable barium alkoxides include barium dimethoxide, barium diethoxide, barium diisopropoxide, barium di-n-butoxide, barium di-sec-butoxide, barium di-t-butoxide, barium di(1,1-dimethylpropoxide), barium di(1,2-dimethyl-propoxide), barium di(1,1-dimethylbutoxide), barium di(1,10-dimethylpentoxide), barium di(2-ethylhexanoxide), barium di(1-methylheptoxide), barium diphenoxide, barium di(p-methylphenoxide), barium di(p-octylphenoxide), barium di(p-nonylphenoxide), barium di(p-dodecylphenoxide), barium di(α-naphthoxide), barium di(β-naphthoxide), barium (o-methoxyphenoxide), barium (o-methoxyphenoxide), barium di(m-methoxyphenoxide), barium di(p-methoxy-phenoxide), barium (o-ethoxyphenoxide), barium (4-methoxy-1-naphthoxide) and the like.

The organozinc compounds which can be utilized are normally of the formula R-Zn-R', wherein R and R' can be the same or different and are selected from alkyl groups, aryl groups, alkaryl groups, and arylalkyl groups which contain from 1 to about 20 carbon atoms. In most cases, R and R' will be the same. As a general rule R and R' will contain from about 1 to about 10 carbon atoms. Normally R and R' will be alkyl groups which contain from 1 to about 6 carbon atoms.

Some representative examples of organozinc compounds which can be employed include dimethylzinc, diethylzinc, di-n-propylzinc, di-iso-propylzinc, di-n-butylzinc, di-iso-propylzinc, di-tert-butylzinc, di-n-pentylzinc, di-n-hexylzinc, di-n-heptylzinc, diphenylzinc, and di-o-tolylzinc. Preferred organozinc compounds include dimethylzinc, diethylzinc, di-n-propylzinc, and di-n-butylzinc.

The molar ratio of the organoaluminum compound to the barium alkoxide will be within the range of about 0.1:1 to about 8:1. It will preferably be within the range of about 1:1 to about 3:1 and will most preferably be within the range of about 2:1 to about 2.4:1. The molar ratio of the organolithium compound to the barium alkoxide will be within the range of about 0.1:1 to about 8:1. The molar ratio of the organolithium compound to the barium alkoxide will preferably be within the range of about 1:1 to about 3:1 and will most preferably be within the range of about 1.8:1 to about 2.2:1. The molar ratio of the organozinc compound to the barium alkoxide will be within the range of about 0.1:1 to about 8:1. The molar ratio of the organozinc compound to the barium alkoxide will preferably be within the range of about 1:1 to about 3:1 with ratios within the range of about 2:1 to about 2.4:1 being most preferred.

The polymerization temperature utilized can vary over a broad temperature range of from about 20° C. to about 180° C. In most cases, a temperature within the range of about 40°

C. to about 120° C. will be utilized. It is typically most preferred for the polymerization temperature to be within the range of about 60° C. to about 85° C. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions are attained. The polymerization can then be terminated using a standard technique. The polymerization can be terminated with a conventional noncoupling type of terminator, such as water, an acid, a lower alcohol, and the like or with a coupling agent.

Coupling agents can be used in order to improve the cold flow characteristics of the rubber and rolling resistance of tires made therefrom. It also leads to better processability and other beneficial properties. A wide variety of compounds suitable for such purposes can be employed. Some representative examples of suitable coupling agents include: multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids, and the like.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl, and the like. The divinylaromatic hydrocarbons are preferred, particularly divinylbenzene in either its ortho, meta, or para isomer. Commercial divinylbenzene which is a mixture of the three isomers and other compounds is quite satisfactory.

While any multiepoxide can be used, we prefer those which are liquid since they are more readily handled and form a relatively small nucleus for the radial polymer. Especially preferred among the multiepoxides are the epoxidized hydrocarbon polymers such as epoxidized liquid polybutadienes and the epoxidized vegetable oils such as epoxidized soybean oil and epoxidized linseed oil. Other epoxy compounds such as 1,2,5,6,9,10-triepoxydecane, and the like, also can be used.

Examples of suitable multiisocyanates include benzene-1,2,4-triisocyanate, naphthalene-1,2,5,7-tetraisocyanate, and the like. Especially suitable is a commercially available product known as PAPI-1, a polyarylpolyisocyanate having an average of 3 isocyanate groups per molecule and an average molecular weight of about 380. Such a compound can be visualized as a series of isocyanate-substituted benzene rings joined through methylene linkages.

The multiimines, which are also known as multiaziridinyl compounds, preferably are those containing 3 or more aziridine rings per molecule. Examples of such compounds include the triaziridinyl phosphine oxides or sulfides such as tri(1-ariridinyl)phosphine oxide, tri(2-methyl-1-ariridinyl) phosphine oxide, tri(2-ethyl-3-decyl-1-ariridinyl)phosphine sulfide, and the like.

The multialdehydes are represented by compounds such as 1,4,7-naphthalene tricarboxyaldehyde, 1,7,9-anthracene tricarboxyaldehyde, 1,1,5-pentane tricarboxyaldehyde, and similar multialdehyde containing aliphatic and aromatic compounds. The multiketones can be represented by compounds such as 1,4,9,10-anthraceneterone, 2,3-diacetonylcyclohexanone, and the like. Examples of the multianhydrides include pyromellitic dianhydride, styrene-maleic anhydride copolymers, and the like. Examples of the multiesters include diethyladipate, triethylcitrate, 1,3,5-tricarbethoxybenzene, and the like.

The preferred multihalides are silicon tetrahalides, such as silicon tetrachloride, silicon tetrabromide, and silicon tetraiodide, and the trihalosilanes such as trifluorosilane, trichlorosilane, trichloroethylsilane, tribromobenzylsilane, and the like. Also preferred are the multihalogen-substituted hydrocarbons, such as 1,3,5-tri(bromomethyl)benzene, 2,4,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione, and the like.

In addition to the silicon multihalides as described hereinabove, other metal multihalides, particularly those of tin, lead, or germanium, also can be readily employed as coupling and branching agents. Difunctional counterparts of these agents also can be employed, whereby a linear polymer rather than a branched polymer results.

Broadly, and exemplarily, a range of about 0.01 to 4.5 milliequivalents of coupling agent are employed per 100 grams of monomer. It is preferred to utilize about 0.01 to about 1.5 milliequivalents of the coupling agent per 100 grams of monomer to obtain the desired Mooney viscosity. The larger quantities tend to result in production of polymers containing terminally reactive groups or insufficient coupling. One equivalent of treating agent per equivalent of lithium is considered optimum amount for maximum branching, if this result is desired in the production line. The coupling agent can be added in hydrocarbon solution, e.g., in cyclohexane, to the polymerization admixture in the final reactor with suitable mixing for distribution and reaction.

Segmented polymers can also be prepared utilizing the high vinyl living polymers which result from utilizing the synthesis techniques of this invention. In cases where segmented polymers are being prepared, the high trans living polymer is utilized as the first segment of the segmented polymer. The high trans polymer segments will have a number average molecular weight which is within the range of about 25,000 to about 350,000.

The living high trans polymer segment will preferably have a molecular weight which is within the range of about 50,000 to about 200,000 and will more preferably have a number average molecular weight which is within the range of about 70,000 to about 150,000.

The second step of making such segmented polymers involves utilizing the living high trans segment to initiate the copolymerization of one or more conjugated diolefin monomers and optionally one or more vinyl aromatic monomers. This polymerization is carried out in the presence of at least one polar modifier. Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine and the like.

The modifier can also be a 1,2,3-trialkoxybenzene or a 1,2,4-trialkoxybenzene. Some representative examples of 1,2,3-trialkoxybenzenes that can be used include 1,2,3-trimethoxybenzene, 1,2,3-triethoxybenzene, 1,2,3-tributoxybenzene, 1,2,3-trihexoxybenzene, 4,5,6-trimethyl-1,2,3-trimethoxybenzene, 4,5,6-tri-n-pentyl-1,2,3-triethoxybenzene, 5-methyl-1,2,3-trimethoxybenzene, and 5-propyl-1,2,3-trimethoxybenzene. Some representative examples of 1,2,4-trialkoxybenzenes that can be used include 1,2,4-trimethoxybenzene, 1,2,4-triethoxybenzene, 1,2,4-tributoxybenzene, 1,2,4-tripentoxybenzene, 3,5,6-trimethyl-1,2,4-trimethoxybenzene, 5-propyl-1,2,4-trimethoxybenzene, and 3,5-dimethyl-1,2,4-trimethoxybenzene. Dipiperidinoethane, dipyrrolidinoethane, tetramethylethylene diamine, diethylene glycol dimethyl ether and tetrahydrofuran are representative of highly preferred modifiers. U.S. Pat. No. 4,022,959 describes the use of ethers and tertiary amines as polar modifiers in greater detail. The utilization of 1,2,3-trialkoxybenzenes and 1,2,4-trialkoxybenzenes as modifiers is described in greater detail in U.S. Pat. No. 4,696,986. The teachings of U.S. Pat. No. 4,022,959 and U.S. Pat. No. 4,696,986 are incorporated herein by reference in their entirety. The microstructure of the repeat units is a function of the polymerization temperature and the amount of polar modifier present. For example, it is known that higher polymerization temperatures result in lower vinyl contents (lower levels of 1,2-microstructure). Accordingly, the polymerization temperature, quantity of modifier and specific modifier selected will be determined with the ultimate desired microstructure of the polymer segment being synthesized being kept in mind.

The second polymeric segment is generally made by adding the polar modifier and monomers to the medium containing the living high trans polymer segment made in the first step. This is accomplished by first adding the modifier to the medium containing the living high trans polymer segment and subsequently adding the additional monomers. Additional solvent can also be added, if necessary, to maintain the total amount of monomers and polymer within the polymerization medium within the range of about 5 to about 35 weight percent (based upon the total weight of the polymerization medium including monomers, polymer and solvent). It is desirable to add a sufficient amount of solvent so as to maintain the total amount of polymer and monomers within the range of about 10 to about 30 weight percent and preferably within the range of about 20 to about 25 weight percent, based upon the total weight of the reaction medium.

The repeat units in the second segment are, of course, derived from conjugated diolefin monomers with the utilization of both 1,3-butadiene and styrene being preferred. The second segment will more preferably be comprised of from about 5 weight percent to about 70 weight percent repeat units which are derived from styrene and from about 30 weight percent to about 95 weight percent repeat units which are derived from 1,3-butadiene. It is normally most preferred for the second segment to contain from about 10 weight percent to about 45 weight percent repeat units which are derived from styrene and from about 55 weight percent to about 90 weight percent repeat units which are derived from 1,3-butadiene.

It is preferred for the second segment to be prepared in a manner whereby the sum of (1) the product of 1.7 and the weight percent of styrene in the second segment and (2) the percentage of 1,2-butadiene linkages in the second segment is within the range of about 50% to about 92%. For example, if the second segment contains 10% bound styrene, it would need to have a 1,2-microstructure (vinyl content) within the range of 45% to 83%. In the event that the second segment contains 40 bound styrene, then the percentage of 1,2-butadiene linkages in the second segment would of necessity be 55% or less. It is more preferred for the sum of (1) the product of 1.7 and the weight percent of styrene in the second segment and (2) the percentage of 1,2-butadiene linkages in the second segment to be within the range of about 70% to about 90%. It is most preferred for the sum of (1) the product of 1.7 and the weight percent of styrene in the second segment and (2) the percentage of 1,2-butadiene linkages in the second segment to be within the range of about 75% to about 85%.

In such styrene-butadiene segments, the distribution of repeat units derived from styrene and butadiene is essentially random. The term "random" as used herein means that less than 1% of the total quantity of repeat units derived from styrene are in blocks containing four or more styrene repeat units. In other words, more than 99% of the repeat units derived from styrene are in blocks containing less than three styrene repeat units. A large quantity of repeat units derived from styrene will, of course, be in blocks containing one styrene repeat unit. Such blocks containing one styrene repeat unit are bound on both sides by repeat units which are derived from 1,3-butadiene.

The copolymerization of butadiene and styrene is generally conducted at the same temperature which is used in making the living high trans polymer. In any case, the copolymerization will be carried out at a temperature which is within the range of about 20° C. to about 100° C. The copolymerization will preferably be conducted at a temperature which is within the range of about 40° C. to about 80° C. and will most preferably be conducted at a temperature which is within the range of 60° C. to 75° C.

The second polymerization step is normally allowed to continue until the monomers are exhausted. In other words, the copolymerization is allowed to continue until the polymerization reaction is complete. A sufficient quantity of monomers will be utilized to attain a number average molecular weight for the second segment which is within the range of about 50,000 to about 350,000. It is normally preferred for the second segment to have a number average molecular weight which is within the range of 100,000 to 250,000 with number average molecular weights within the range of 220,000 to 240,000 being most preferred.

The ratio of the number average molecular weight of the first segment (high trans polymer segment) to the number average molecular weight of the second segment will typically be within the range of about 25/75 to about 75/25. This ratio plays an important role in determining the morphology of the polymer.

After the copolymerization has been completed, the segmented elastomer can be recovered from the organic solvent. The segmented elastomer can be recovered from the organic solvent and residue by means such as decantation, filtration, centrification and the like. It is often desirable to precipitate the segmented polymer from the organic solvent by the addition of lower alcohols containing from about 1 to about 4 carbon atoms to the polymer solution. Suitable lower alcohols for precipitation of the segmented polymer from the polymer cement include methanol, ethanol, isopropyl alcohol, normal-propyl alcohol and t-butyl alcohol. The utilization of lower alcohols to precipitate the segmented polymer from the polymer cement also "kills" the living polymer by inactivating lithium end groups. After the segmented polymer is recovered from the solution, steam stripping can be employed to reduce the level of volatile organic compounds in the segmented polymer.

There are valuable benefits associated with utilizing the segmented elastomers of this invention in making tire tread compounds. Tire tread compounds can be made using these segmented polymers without the need to blend additional rubbers therein. However, in many cases, it will be desirable to blend the segmented elastomer with one or more additional rubbers to attain the desired performance characteristics for the tire tread compound. For instance, the segmented rubber can be blended with natural rubber to make tread compounds for passenger tires which exhibit outstanding rolling resistance, traction and tread wear characteristics. Such blends will normally contain from about 5 to about 40 weight percent natural rubber and from about 60 to about 95% of the segmented elastomer. High performance tires which exhibit very exceptional traction characteristics, but somewhat compromised tread wear, can be prepared by blending the segmented elastomer with solution or emulsion styrene-butadiene rubber (SBR). In cases where tread wear is of greater importance than traction, high cis-1,4-polybutadiene can be substituted for the SBR. In any case, the segmented rubbers of this invention can be used to improve the traction, tread wear and rolling resistance of tires made therewith.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

In this experiment high trans-1,4-polybutadiene was synthesized utilizing the initiator system and technique of this invention. In the procedure employed 2000 grams of a premixed solution containing 150 1,3-butadiene and 850 hexane was added under nitrogen to a one gallon (3.785 liter) reactor. The reactor was subsequently heated to a temperature of 70° C. Then the four initiator components were added in the following order: 3.2 ml of 1M diethylzinc (3.2 mmole), 1.6 ml of 0.91M barium 2-ethylhexoxide (1.45 mmole), 1.6 ml of 1.6M n-butyllithium (2.5 mmole), and 1.6 ml of 1.9M triethylaluminum (3 mmole). After a polymerization time of 6 hours a monomer conversion of about 90 percent was attained. The polymer produced was determined to be a gel free high trans polybutadiene rubber. Analysis showed the polybutadiene rubber to have 85% trans, 12% cis, and 3% vinyl microstructure. It was further determined to have a glass transition temperature (Tg) at −85° C. and a melting peak at 41% C.

EXAMPLE 2

In this series of experiments styrene-butadiene rubbers were synthesized utilizing the initiator system of this invention. The procedure utilized was similar to the procedure employed in Example 1 except for the fact that monomer premix solutions containing various ratios of styrene and 1,3-butadiene were employed. In this series of experiments triisobutylaluminum was also substituted for the triethylaluminum employed in Example 1 since earlier studies had shown that triisobutylaluminum gives somewhat better styrene incorporation than triethylaluminum or trimethylaluminum.

At a 25%/75% styrene/1,3-butadiene ratio the rate of styrene incorporation trails the rate of 1,3-butadiene incorporation. The percentage of styrene monomer conversion and the percentage of 1,3-butadiene monomer conversion after various polymerization times at the 25%/75% styrene/1,3-butadiene ratio were as follows:

| Time | % Styrene | % Butadiene |
| --- | --- | --- |
| 1 hour | 18 | 29 |
| 2 hours | 39 | 56 |
| 4 hours | 69 | 84 |
| 6 hours | 83 | 93 |

At a 50%/50% styrene/1,3-butadiene ratio the styrene monomer is incorporated into the polymer a rate which is closer to the rate of butadiene incorporation. The percentage of styrene monomer conversion and the percentage of 1,3-butadiene monomer conversion after various polymerization times at the 50%/50% styrene/1,3-butadiene ratio were as follows:

| Time | % Styrene | % Butadiene |
| --- | --- | --- |
| 1 hour | 7 | 13 |
| 2 hours | 29 | 39 |
| 3 hours | 54 | 63 |
| 6.5 hours | 90 | 95 |

At a 60%/40% styrene 1,3-butadiene ratio the rate of styrene incorporation and the rate of butadiene incorporation are essentially the same. Thus, a 60/40 ratio of styrene to butadiene is an azeotropic concentration since at this monomer charge ratio the monomer ratio in the polymer will always be the same. The percentage of styrene monomer conversion and the percentage of 1,3-butadiene monomer conversion after various polymerization times at the 60%/40% styrene/1,3-butadiene ratio were as follows:

| Time | % Styrene | % Butadiene |
| --- | --- | --- |
| 1 hour | 58 | 63 |
| 3 hours | 85 | 87 |
| 5 hours | 96 | 96 |

At a 75/25 ratio of styrene to butadiene the styrene incorporates into the rubber at a faster rate than the butadiene. The percentage of styrene monomer conversion and the percentage of 1,3-butadiene monomer conversion after various polymerization times at the 75%/25% styrene/1,3-butadiene ratio were as follows:

| Time | % Styrene | % Butadiene |
| --- | --- | --- |
| 2 hour | 55 | 41 |
| 3 hours | 79 | 67 |
| 4 hours | 91 | 85 |
| 7 hours | 98 | 96 |

In cases where the molar ratio of styrene to 1,3-butadiene is less than about 1:4, the styrene incorporates into the styrene-butadiene rubber in an essentially random manner. However, in cases where higher ratios of styrene to butadiene are employed the styrene tends to polymerize into small blocky segments which are essentially uniformly dispersed from one end to the other end of the polymer chains. At a molar ratio of styrene to butadiene of greater than about 4:6, the styrene polymerizes into short blocks which typically contain from about 7 to 15 repeat units and which alternate with polybutadiene blocks. In other words, a very unique styrene-butadiene-styrene type of alternating block copolymer is produced.

EXAMPLE 3

In order to simplify potential commercial scale plant operations an attempt was made to combine all four components of the initiator in a small quantity of butadiene/hexane premix. The initiator made by this technique proved to be fully soluble and was as effective as the insitu formed initiator made in Example 1.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A catalyst system which is the reaction product of (a) at least one organolithium initiator, (b) triisobutyl aluminum, (c) barium 2-ethylhexoxide and (d) an organozinc compound, wherein the molar ratio of the triisobutyl aluminum to the barium 2-ethylhexoxide is within the range of about 0.1:1 to about 8:1; wherein the molar ratio of the organolithium compound to the barium 2-ethylhexoxide is within the range of about 0.1:1 to about 8:1; wherein the molar ratio of the organozinc compound to the barium 2-ethylhexoxide is within the range of about 0.1:1 to about 8:1.

2. A catalyst system as specified in claim 1 wherein the organolithium initiator is an organomonolithium compound.

3. A catalyst system as specified in claim 2 wherein the organozinc compound is of the formula R-Zn-R', wherein R and R' can be the same or different and are selected from alkyl groups, aryl groups, alkaryl groups, and arylalkyl groups which contain from 1 to about 20 carbon atoms.

4. A catalyst system as specified in claim 3 wherein the molar ratio of the triisobutyl aluminum to the barium 2-ethylhexoxide is within the range of about 1:1 to about 3:1; wherein the molar ratio of the organolithium compound to the barium 2-ethylhexoxide is within the range of about 1:1 to about 3:1; and wherein the molar ratio of the organozinc compound to the barium 2-ethylhexoxide is within the range of about 1:1 to about 3:1.

5. A catalyst system as specified in claim 4 wherein the organolithium initiator is selected from the group consisting of ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, and cyclohexyllithium.

6. A catalyst system as specified in claim 5 wherein the organozinc compound is selected from the group consisting of diethylzinc, di-n-propylzinc, di-iso-propylzinc, di-n-butylzinc, di-iso-propylzinc, di-tert-butylzinc, di-n-pentylzinc, di-n-hexylzinc, and di-n-heptylzinc.

7. A catalyst system as specified in claim 6 wherein the molar ratio of the triisobutyl aluminum to the barium 2-ethylhexoxide is within the range of about 2:1 to about 2.4:1; wherein the molar ratio of the organolithium compound to the barium 2-ethylhexoxide is within the range of about 1.8:1 to about 2.2:1; and wherein the molar ratio of the organozinc compound to the barium 2-ethylhexoxide is within the range of about 2:1 to about 2.4:1.

8. A catalyst system as specified in claim 7 wherein the organozinc compound is selected from the group consisting of diethylzinc, di-n-propylzinc, di-iso-propylzinc, and di-n-butylzinc.

9. A catalyst system as specified in claim 1 wherein the organozinc compound is diethylzinc.

10. A catalyst system as specified in claim 1 wherein the organolithium initiator is n-butyllithium.

11. A catalyst system as specified in claim 9 wherein the organolithium initiator is n-butyllithium.

* * * * *